Patented Oct. 17, 1939

2,176,407

UNITED STATES PATENT OFFICE 2,176,407

PEROXIDIC PRODUCTS

Nicholas A. Milas, Belmont, Mass., assignor to Massachusetts Institute of Technology, Cambridge, Mass., a corporation of Massachusetts No Drawing. Application September 18, 1936, Serial No. 101,503

16 Claims. (Cl. 260—610)

This invention relates to a process of producing peroxidic products which are useful, for example, as germicides, fungicides, bleaching agents, a reagent in the synthesis of various compounds, etc.

The principal object of the invention is to provide a simple, efficient and reliable process of producing relatively stable peroxidic products from alcohols. Further objects will be apparent from a consideration of the following description which discloses different embodiments of the invention by way of illustration.

By the expression "alcohol" as used hereinafter in the description and claims I mean to include broadly primary, secondary and tertiary alcohols, which compounds may contain one or more hydroxyl groups.

I have found that alcohols as a class may be treated with hydrogen peroxide in highly concentrated aqueous solution, and that when the resulting aqueous alcoholic-peroxide mixture is treated in any suitable manner to remove the water, there is produced a relatively stable peroxidic compound which, if desired, may be further stabilized by the addition, for example, of small amounts of glacial metaphosphoric acid.

In accordance with the present invention the aqueous alcoholic-peroxide mixture either may be treated directly with an inorganic salt having a greater affinity for water than for hydrogen peroxide, thereby salting out the peroxidic mixture which is subsequently treated with a dehydrating agent to remove substantially all residual water, or the aqueous alcoholic-peroxide mixture may be distilled at low temperatures and under reduced pressures, in which case the water is removed with the excess alcohol if the latter has a boiling point lower than water, but if the alcohol has a boiling point higher than water, the latter is distilled off and the peroxide concentrated in the alcohol. In either case, the concentrated peroxidic product preferably is mixed with more alcohol, and a small amount of glacial metaphosphoric acid (5% or less) is added and the distillation resumed. Under these conditions the hydrogen peroxide reacts with the alcohol to form a relatively stable peroxidic product which is distilled over with the excess alcohol.

When the aqueous alcoholic-peroxide mixture is salted out or otherwise treated to remove the water therefrom, the alcohol and peroxide apparently are loosely bound, as illustrated by the following equations:

(1) 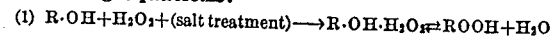

(2) 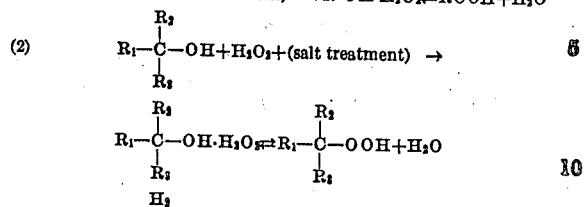

(3) 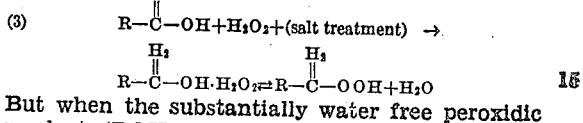

But when the substantially water free peroxidic product (ROH·H₂O₂; R₁R₂R₃=COH·H₂O₂; etc.) is distilled or subjected to a thorough dehydration, the alcohol and peroxide become permanently bonded, as illustrated in the following equations:

(4) 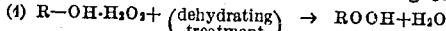

(5) 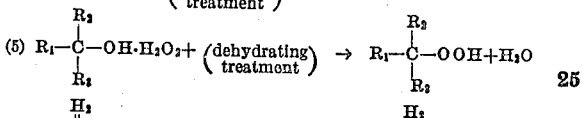

(6) 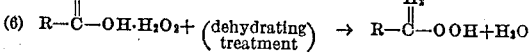

Thus, when the substantially anhydrous peroxidic product, produced by salting out the hydrogen peroxide-alcohol mixture, is distilled at low temperatures and under reduced pressure, in the presence of glacial metaphosphoric acid, the products obtained are identical with those produced by the second procedure above described, both products being alkyl hydroperoxides conforming to such formulae as

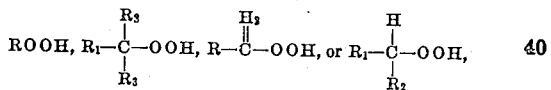

etc., (as the case may be), wherein R, R₁ R₂, etc. are different hydrocarbon radicals.

Although the hydroperoxides thus produced are relatively stable and hence particularly suitable for germicides and other uses above mentioned, the substantially anhydrous peroxidic product obtained by salting out the alcohol-peroxide mixture, is likewise stable and susceptible to practically the same advantageous uses as the hydroperoxides. The stability of the substantially anhydrous peroxidic products is believed to be due partly to the equilibrium action producing the hydroperoxides, as shown in Equations 1 to 3.

In the process herein described the concentration of alkyl hydroperoxide increases as the dehydration increases, this being particularly true with tertiary alcohols in which the hydroxyl radical is relatively loosely bound to the carbon atom. For example, if an anhydrous tertiary butyl alcohol—hydrogen peroxide mixture—is distilled at low temperatures and under reduced pressure in the presence of glacial metaphosphoric acid, a product is obtained which, when free from tertiary butyl alcohol, shows the composition

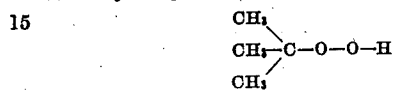

and hydrolyzes to give hydrogen peroxide and tertiary butyl alcohol. A further proof that hydrogen peroxide in anhydrous alcoholic solutions undergoes a further reaction represented by Equations 4 to 6 is borne out by the fact that catalysts, such as osmium tetroxide which completely destroys in a very short time hydrogen peroxide when dissolved in water, have very little effect in solutions and products prepared in accordance with the present invention.

Specific examples of my invention are as follows:

EXAMPLE 1

*Tertiary butyl alcohol.*—400 cc. of substantially pure tertiary butyl alcohol was added to 100 cc. of about 30% hydrogen peroxide and the mixture treated with anhydrous sodium sulfate so that two layers separate out. The alcohol layer which contains most of the peroxide, is removed and dried with anhydrous sodium sulfate or with anhydrous calcium sulfate. A product is obtained which contains 6.32% peroxide in tertiary butyl alcohol, giving a recovery of about 93.8% of peroxidic product in terms of hydrogen peroxide.

If desired, other salts than sodium sulfate may be used to salt out the peroxide, and it is to be understood that the salt may be added to the hydrogen peroxide and then the alcohol added to this mixture, or the alcohol added first to the hydrogen peroxide and the salt added to the resulting mixture. It makes no material difference in the order in which the various reagents are added. The following table shows the results obtained by treating aqueous tertiary butyl alcohol—hydrogen peroxide mixtures—with different inorganic salts, and in each of the examples shown therein three volumes of alcohol were used to one volume of peroxide and approximately 0.8 part of the salt.

Table I

| Salt used | Peroxidic product expressed as percent hydrogen peroxide in tertiary butanol | Percent yield of peroxidic product |
|---|---|---|
| $Na_2SO_4$ | 7.31 | 65.5 |
| $KH_2PO_4$ | 8.16 | 73.0 |
| $MgSO_4 \cdot 7H_2O$ | 8.81 | 84.5 |
| $MgSO_4$ | 9.01 | 82.4 |
| $NaNH_4HPO_4 \cdot 4H_2O$ | 5.71 | 51.5 |
| $NH_4Cl$ | 6.45 | 56.6 |
| $MgCl_2$ | 7.15 | 75.3 |
| $(NH_4)_2SO_4$ | 5.00 | 43.8 |
| $NH_4H_2PO_4$ | 8.34 | 82.5 |
| $(NH_4)_2HPO_4$ | 4.09 | 33.9 |
| $NaCl$ | 7.45 | 66.9 |
| $KCl$ | 6.15 | 56.0 |

The alcoholic solutions thus obtained are further dried with anhydrous sodium or calcium sulfates, or they may be distilled as above described, and to the products thus formed small amounts of metaphosphoric acid may be added to stabilize them further.

EXAMPLE 2

*Methyl ether of diethylene glycol ("Carbitol").*—200 cc. of substantially pure "Carbitol" was added to 100 cc. of 30% hydrogen peroxide and the mixture was then treated with approximately 0.8 part of anhydrous sodium sulfate. The anhydrous alcoholic-peroxide mixture thus produced was subjected to further dehydration, as above set forth, and an analysis of the resulting product showed 6.01% peroxidic product in terms of hydrogen peroxide.

EXAMPLE 3

*Tertiary amyl alcohol.*—A mixture of 300 cc. of tertiary amyl alcohol and 100 cc. of 30% hydrogen peroxide was treated as set forth in Example 2. An analysis of the resulting product showed 8.95% peroxidic product in terms of hydrogen peroxide.

EXAMPLE 4

*Ethanol.*—A mixture of 300 cc. of ethanol and 100 cc. of 30% hydrogen peroxide was treated as set forth in Example 2. An analysis of the resulting product showed 7.71% peroxidic product in terms of hydrogen peroxide.

EXAMPLE 5

*Secondary butanol.*—A mixture of 300 cc. of secondary butanol and 100 cc. of 30% hydrogen peroxide was treated as set forth in Example 2. An analysis of the resulting product showed 5.94% peroxidic product in terms of hydrogen peroxide.

EXAMPLE 6

*Monoethyl ether of ethylene glycol ("Cellosolve").*—A mixture of 300 cc. of "Cellosolve" and 100 cc. of 30% hydrogen peroxide was treated as set forth in Example 2. An analysis of the resulting product showed 8.34% peroxidic product in terms of hydrogen peroxide.

EXAMPLE 7

*Monomethyl ether of ethylene glycol ("Methyl Cellosolve").*—A mixture of 300 cc. of "Methyl Cellosolve" and 100 cc. of 30% hydrogen peroxide was treated as set forth in Example 2. An analysis of the resulting product showed 7.41% peroxidic product in terms of hydrogen peroxide.

EXAMPLE 8

*Diethylene glycol.*—A mixture of 300 cc. of diethylene glycol and 100 cc. of 30% hydrogen peroxide was treated as set forth in Example 2. An analysis of the resulting product showed 6.84% peroxidic product in terms of hydrogen peroxide.

EXAMPLE 9

*Ethylene glycol.*—A mixture of 300 cc. of ethylene glycol and 100 cc. of 30% hydrogen peroxide was treated as set forth in Example 2. An analysis of the resulting product showed 6.65% peroxidic product in terms of hydrogen peroxide.

EXAMPLE 10

*Isopropanol.*—A mixture of 300 cc. of isopropanol and 100 cc. of 30% hydrogen peroxide was treated as set forth in Example 2. An analysis of the resulting product showed 8.63% peroxidic product in terms of hydrogen peroxide.

EXAMPLE 11

*Benzyl alcohol.*—A mixture of three volumes (60 cc.) of benzyl alcohol and one volume (20 cc.) of about 30% hydrogen peroxide was treated with 0.8 part (16 g.) of anhydrous sodium sulfate and the reaction mixture was dehydrated with 0.4 part (8 g.) of sodium sulfate. An analysis of the resulting product showed 2.87% peroxidic product in terms of hydrogen peroxide.

EXAMPLE 12

*Cineol.*—A mixture of three volumes of cineol and one volume of 30% hydrogen peroxide was treated as set forth in Example 11. An analysis of the resulting product showed 1.80% peroxidic product in terms of hydrogen peroxide.

EXAMPLE 13

*Cyclohexanol.*—A mixture of three volumes of cyclohexanol and one volume of 30% hydrogen peroxide was treated as set forth in Example 11. An analysis of the resulting product showed 4.36% peroxidic product in terms of hydrogen peroxide.

EXAMPLE 14

*4-methylcyclohexanol.*—A mixture of three volumes of 4-methylcyclohexanol and one volume of 30% hydrogen peroxide was treated as set forth in Example 11. An analysis of the resulting product showed 2.96% peroxidic product in terms of hydrogen peroxide.

EXAMPLE 15

*Tetrahydrofurfuryl alcohol.*—A mixture of three volumes of tetrahydrofurfuryl and one volume of 30% hydrogen peroxide was treated as set forth in Example 11. An analysis of the resulting product showed 7.30% peroxidic product in terms of hydrogen peroxide.

Peroxidic products produced in accordance with the present invention are not only relatively stable but also possess remarkable germicidal and fungicidal properties, having a good penetration. For example, the germicidal and fungicidal properties of the peroxidic product produced from tertiary butanol, as determined in accordance with the methods proposed by the U. S. Food and Drug Administration (see G. L. A. Ruehle and C. M. Brewer, "U. S. Food and Drug Administration Methods of Testing Antiseptics and Disinfectants", U. S. Department of Agriculture Circular No. 198, December, 1931) are shown in the following table:

*Table II*

| Test organism | Incubation time and temp. | Distance in mm. from edge of cup to growth | | | |
|---|---|---|---|---|---|
| | | Sabourand's argar | Sab. argar + 10% serum | Reddish argar | Red. argar + 10% serum |
| T. interdigitalis (3 strains). | 4 days, 30° C. | 18 | 19 | | |
| S. aureus (Gov. 209) | 2 days, 37° C. | | | 10 | 11 |
| E. typhi (Hopkins) | 2 days, 37° C. | | | 14 | 14 |
| E. coli | 2 days, 37° C. | | | 10 | 10 |
| B. subtilis | 2 days, 37° C. | | | 10 | 12 |

It is apparent from the foregoing that peroxidic products produced in accordance with the present invention are not only effective to destroy bacteria, but also fungi which are known to have a greater resistance to common germicides.

I claim:

1. The process of producing peroxidic products, which comprises subjecting an aqueous alcohol-hydrogen peroxide mixture to a dehydration treatment sufficient to cause the alcohol and hydrogen peroxide to condense at least in part to a hydroperoxide.

2. The process of producing peroxidic products, which comprises subjecting an aqueous alcohol-hydrogen peroxide mixture to the action of an inorganic salt having a greater affinity for water than for hydrogen peroxide.

3. The process of producing peroxidic products, which comprises treating an alcohol with aqueous hydrogen peroxide solution in the presence of an inorganic compound having a greater affinity for water than for hydrogen peroxide.

4. The process of producing peroxidic products, which comprises treating an alcohol with aqueous hydrogen peroxide solution in the presence of an inorganic compound having a greater affinity for water than for hydrogen peroxide, and subjecting the resulting substantially water-free intermediate product to further dehydration treatment sufficient to cause condensation of at least a part of said intermediate product to hydroperoxide.

5. The process of producing peroxidic products, which comprises subjecting an aqueous alcohol-hydrogen peroxide mixture to the action of an inorganic compound having a greater affinity for water than for hydrogen peroxide, and subjecting the resulting substantially water-free intermediate product, in the presence of meta phosphoric acid, to further dehydration treatment sufficient to cause condensation of at least a part of said intermediate product to hydroperoxide.

6. The process of producing peroxidic products, which comprises distilling an aqueous alcohol-hydrogen peroxide mixture to remove substantially all the water therein, and subjecting the concentrated product to further distillation under reduced pressure.

7. The process of producing peroxidic products, which comprises treating an alcohol with aqueous hydrogen peroxide in the presence of an inorganic compound having a greater affinity for water than for hydrogen peroxide, and subjecting the resulting product to distillation under reduced pressure and in the presence of metaphosphoric acid.

8. The process of producing peroxidic products, which comprises subjecting a tertiary butanol-hydrogen peroxide mixture to a dehydration treatment sufficient to cause the tertiary butanol and hydrogen peroxide to condense at least in part to tertiary butanol hydroperoxide.

9. The process of producing peroxidic products, which comprises subjecting a tertiary amyl alcohol-hydrogen peroxide mixture to a dehydration treatment sufficient to cause the tertiary amyl alcohol to condense at least in part to tertiary amyl hydroperoxide.

10. The process of producing peroxidic products, which comprises subjecting a secondary butyl alcohol-hydrogen peroxide mixture to a dehydration treatment sufficient to cause the secondary butyl alcohol and hydrogen peroxide to condense at least in part to secondary butyl hydroperoxide.

11. A peroxidic composition containing as an essential ingredient an anhydrous alcohol-peroxide containing a small amount of metaphosphoric acid.

12. A peroxidic composition containing as an essential ingredient an alkyl hydroperoxide conforming to the formula

13. A peroxidic composition containing as an essential ingredient an alkyl hydroperoxide conforming to the formula

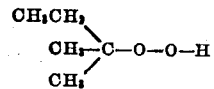

14. A peroxidic composition containing as an essential ingredient an alkyl hydroperoxide conforming to the formula

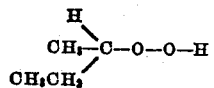

15. A peroxidic composition containing as an essential ingredient a compound of the formula

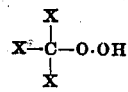

wherein each of the X's represents a monovalent hydrocarbon radical.

16. A peroxidic composition consisting essentially of an equilibrium mixture of an alcohol peroxide and a compound of the formula $$R \cdot OH \cdot H_2O_2$$

wherein R is the radical R of an alcohol R·OH.

NICHOLAS A. MILAS.